United States Patent
Fernandez

(10) Patent No.: US 10,825,360 B2
(45) Date of Patent: Nov. 3, 2020

(54) RECONSTITUTION OF POST MORTEM CIRCULATION, SPECIALIZED METHODS AND PROCEDURES

(71) Applicant: Maximum Fidelity Surgical Simulations, LLC, Columbia, MO (US)

(72) Inventor: Joss Dean Fernandez, Columbia, MO (US)

(73) Assignee: MAXIMUM FIDELITY SURGICAL SIMULATION, LLC, Columbia, MO (US)

( * ) Notice: Subject to any disclaimer, the term of this patent is extended or adjusted under 35 U.S.C. 154(b) by 0 days.

(21) Appl. No.: 16/189,657

(22) Filed: Nov. 13, 2018

(65) Prior Publication Data

US 2019/0147768 A1 May 16, 2019

Related U.S. Application Data

(60) Provisional application No. 62/585,164, filed on Nov. 13, 2017, provisional application No. 62/608,310, (Continued)

(51) Int. Cl.
*G09B 23/30* (2006.01)
*A01N 1/00* (2006.01)

(52) U.S. Cl.
CPC ............ *G09B 23/303* (2013.01); *A01N 1/00* (2013.01)

(58) Field of Classification Search
CPC ................................ G09B 23/303; A01N 1/00
See application file for complete search history.

(56) References Cited

U.S. PATENT DOCUMENTS

| 3,912,809 A | 10/1975 | Rendon |
| 4,982,481 A | 1/1991 | Deutscher |
| (Continued) | | |

FOREIGN PATENT DOCUMENTS

| WO | 2006124021 A1 | 11/2006 |
| WO | 2007089777 A2 | 8/2007 |
| (Continued) | | |

OTHER PUBLICATIONS

International Search Report and Written Opinion received for PCT/US18/60808 dated Mar. 6, 2019, 12 pages.
(Continued)

*Primary Examiner* — Corbett B Coburn
(74) *Attorney, Agent, or Firm* — Kutak Rock LLP; Joseph E. Zahner

(57) ABSTRACT

A system for and method of reconstituting post mortem circulation is provided. Certain methods include simulating natural clotting cascades at wound sites while preventing clotting in reservoirs and within the cadaver. Clot prevention in the reservoir and the cadaver are accomplished with an anticoagulant and a dispersant, respectively. Simulation of clotting at the wound site is accomplished by diluting cadaver fluid with reservoir fluid, thereby diluting the dispersant. The cadaver fluid contains excess calcium for resisting the anticoagulant of the reservoir fluid. Certain methods of the present invention also include reanimating a heart, attaching foreign cadaveric circulatory branches to other cadaveric tissue, enabling mobile cadaveric perfusion, and utilizing a water bath with gravity-feed perfusion.

20 Claims, 6 Drawing Sheets

Related U.S. Application Data filed on Dec. 20, 2017, provisional application No. 62/750,055, filed on Oct. 24, 2018.

(56) References Cited

U.S. PATENT DOCUMENTS

| | | | |
|---|---|---|---|
| 5,178,620 A | | 1/1993 | Eggers et al. |
| 5,429,797 A | | 7/1995 | Camiener |
| 5,574,019 A | | 11/1996 | Segall et al. |
| 5,607,411 A | | 3/1997 | Heironimus et al. |
| 6,110,139 A | | 8/2000 | Loubser |
| 6,190,400 B1 | | 2/2001 | Van De Moer et al. |
| 6,191,193 B1 | | 2/2001 | Lee et al. |
| 6,218,099 B1 | | 4/2001 | Segall et al. |
| 6,312,694 B1 | | 11/2001 | Thorpe et al. |
| 6,371,942 B1 | | 4/2002 | Schwartz et al. |
| 6,478,808 B2 | | 11/2002 | Nowakowski |
| 6,790,043 B2 | | 9/2004 | Aboud |
| 6,824,389 B1* | | 11/2004 | Garrett, Jr. ............ G09B 23/306 434/262 |
| 8,980,774 B2 | | 3/2015 | Zhang et al. |
| 9,968,292 B2 | | 5/2018 | Gardner et al. |
| 2002/0018752 A1 | | 2/2002 | Krall et al. |
| 2003/0180824 A1 | | 9/2003 | Mpock et al. |
| 2003/0186203 A1 | | 10/2003 | Aboud |
| 2003/0206884 A1 | | 11/2003 | Barrow |
| 2009/0012413 A1 | | 1/2009 | Sabbah et al. |
| 2009/0130104 A1 | | 5/2009 | Muzykantov et al. |
| 2009/0246747 A1 | | 10/2009 | Buckman, Jr. |
| 2010/0323339 A1 | | 12/2010 | Ritchie |
| 2012/0270197 A1 | | 10/2012 | Brost et al. |
| 2013/0137702 A1* | | 5/2013 | Steiner ...................... A61P 7/02 514/252.12 |
| 2014/0270738 A1* | | 9/2014 | Lynch .................. A61M 5/445 392/443 |
| 2014/0272880 A1 | | 9/2014 | Buckman |
| 2016/0140878 A1* | | 5/2016 | Fernandez ............... A01N 1/00 434/268 |
| 2016/0287744 A1 | | 10/2016 | Kobayashi et al. |

FOREIGN PATENT DOCUMENTS

| | | |
|---|---|---|
| WO | 2011126801 A2 | 10/2011 |
| WO | 2014052158 A3 | 4/2014 |
| WO | 2019094959 A1 | 5/2019 |

OTHER PUBLICATIONS

International Search Report and Written Opinion received for PCT/US2015/061399 dated Feb. 2, 2016, 10 pages.

Abboud, M.D., et al., "New laboratory model for neurosurgical training that stimulates live surgery," J. Neurosurg, Dec. 2002, pp. 1367-1372, vol. 97, USA.

Chevallier et al., "Postmortem Circulation: A New Model for Testing Endovascular Devices and Training Clinicians in Their Use," Clinical Anatomy, 2014, pp. 556-562, vol. 27.

Garrett, Edward H., Jr. MD, "A human-cadaveric circulation model," Journal of Vascular Surgery, 2001, pp. 1128-1130, vol. 33, No. 5.

Carey et al., "Simulation of plastic surgery and microvascular procedures using perfused fresh human cadavers," Journal of Plastic, Reconstructive & Aesthetic Surgery, 2014, pp. e42-e48, vol. 67.

Zapata et al., "Study of postmortem blood circulation," 1 page abstract, 1989, Spain.

Russin et al., "Simulation of a High-Flow Extracranial-Intracranial Bypass Using a Radial Artery Graft in a Novel Fresh Tissue Model," Neurosurgery, Dec. 2012, pp. ons315-320, vol. 71, No. 2.

Arbatli et al., "Dynamic Human Cadaver Model for Testing the Feasibility of New Endovascular Techniques and Tools," Anals of Vascular Surgery, Apr. 2010, pp. 419-422, vol. 24, issue 3.

Wolff et al., "Flap raising on pulsatile perfused cadaveric tissue: A novel method for surgical teaching and exercise," Journal of Cranio-Maxillo-Facial Surgery, 2014, pp. 1423-1427, vol. 42, Elsevier Ltd.

Willaert et al., "Postmortem Pump-Driven Reperfusion of the Vascular System of Porcine Lungs: Towards a New Model for Surgical Training," European Surgical Research, Jan. 2014, pp. 8-20, vol. 52.

Perlmutter et al., "Microsurgical anatomy of the distal anterior cerebral artery," J. Nuerosurg., Aug. 1978, pp. 204-228, vol. 49.

De Castro Abreu, M.D., et al., "Robotic Transabdominal Control of the Suprahepatic, Infradiaphragmatic Vena Cava to Enable Level 3 Caval Tumor Thrombectomy: Pilot Study in a Perfused-Cadaver Model," Journal of Endourology, Oct. 2015, pp. 1177-1181, vol. 29, No. 10.

Gray, Richard, "What lurks beneath: plastinated veins of blue shark to feature in new exhibition," Apr. 2012, https://www.telegraph.co.uk/news/newstopics/howaboutthat/9178001/What-lurks-beneath-plastinated-veins-of-blue-shark-to-feature-in-new-exhibition.html (last accessed Aug. 5, 2019).

Carey et al., "Perfused fresh cadavers: method for application to surgical simulation," The American Journal of Surgery, Jul. 2015, vol. 210, No. 1, pp. 179-187, Elsevier.

"MedCure Now Offers Perfused Fresh Tissue Models," press release, 3 pages, Oct. 2014.

Extended European Search Report, dated May 4, 2018 in EP Application No. 15861329.9, 7 pages.

Aboud et al., "Novel Simulation for Training Trauma Surgeons," The Journal of TRAUMA Injury, Infection, and Critical Care, Dec. 2011, pp. 1484-1486, vol. 71, No. 6.

DeLorenzo et al., "Perfused Cadavers as a Training Model for Invasive Lifesaving Procedures," Annals of Emergency Medicine, Nov. 2013, 1 page abstract, vol. 62, No. 5.

\* cited by examiner

RECONSTITUTION OF POST MORTEM CIRCULATION, SPECIALIZED METHODS AND PROCEDURES

CROSS-REFERENCE TO RELATED APPLICATIONS

This application claims priority pursuant to 35 U.S.C. 119(e) to U.S. Provisional Patent Application Ser. Nos. 62/585,164, filed Nov. 13, 2017, 62/608,310, filed Dec. 20, 2017, and 62/750,055, filed Oct. 24, 2018, the entire disclosures of which are incorporated herein by reference.

FIELD OF THE INVENTION

The present invention relates generally to systems for and methods of performing surgical training and developing and testing medical equipment and other devices. More specifically, the present invention is concerned with systems for and methods of creating realistic models for use in surgical training and medical research and for performing such training on such models.

BACKGROUND OF THE INVENTION

The successful training and preparation of physicians depends on accurate and realistic simulations, with cadavers and human organs remaining an important resource for such training. Unfortunately, performing procedures on plastic models and animals is significantly different from performing the same procedure on a living patient. Consequently, it would be beneficial to have a system for and a method of more closely modeling a living patient (or at least living tissue) during physician training and medical research.

U.S. Pat. No. 6,824,389 ("Garrett") teaches a perfused human cadaver model for the purposes of simulating the circulatory systems. Unfortunately, this method was hampered by severe bloating/edema of the soft tissue due to the capillary leak seen following the cessation of cellular respiration. Improving upon the Garret disclosure, U.S. Patent Publication No. 2016/0140878 ("Fernandez") teaches a new method of preventing fluid extravasation and subsequent methods to perfuse cadavers with a single cannulation site. Although a superior method, the effectivity of the method is still somewhat limited in certain environments and for certain procedures.

Garrett and Fernandez teach systems for and methods of preparing cadavers, such as in a surgical training facility, by pumping fluid into the cadaver, thereby creating a surgical model that is superior to models previously available. Unfortunately, these models were not very mobile. Consequently, training is somewhat limited to "surgical room" training, where patients can be prepped and generally do not need to be moved. Unfortunately, not all real-life scenarios are "surgical room" scenarios. Consequently, it would be beneficial to have a mobile model. It would further be beneficial if the mobile model facilitated training for a variety of scenarios, such as "emergency room" scenarios, "accident scene" scenarios, "natural disaster" scenarios, "crime scene" scenarios, "terrorism" scenarios, "battlefield" scenarios, and the like.

Garrett and Fernandez teach systems for and methods of using cadavers to create a surgical model that is superior to models previously available. Unfortunately, whole cadavers are expensive and difficult to store while certain cadaveric tissue (portions of cadavers) tend to be less expensive and easier to store. Furthermore, many procedures merely require a portion of a cadaver rather than a whole cadaver. Furthermore still, it can be expensive and time-consuming to flush cadaveric arterial and/or venous branches and/or to otherwise prepare entire (or large portions of) cadaveric circulatory systems using the systems and methods of the present invention and of the prior art. Furthermore yet, cadaveric circulatory systems can be damaged during preparation, potentially rendering such cadaver unusable with certain methods (and/or creating uncertainty or otherwise adversely affecting feasibility and/or usefulness of a cadaver. Consequently, it would be beneficial to have a system for and a method of utilizing portions of a cadaver. It would further be beneficial to have a system for and a method of utilizing a foreign cardiovascular branch with a cadaver and/or with cadaveric tissue. It would still further be beneficial to have a hybrid system for and a hybrid method of using a low cost, anatomically accurate and predictable, synthetic cardiovascular branch with cadaveric tissue of one or more cadaver.

As catheter based heart valve procedures advance, the need for a true functional heart valve model is needed. Current technologies make use of artificial valves within synthetic circuit to model the heart valve or use live animal models. Both have their disadvantages. For instance, blood of a living animal is opaque, preventing direct visualization, while the flow of synthetic models does not closely resemble human tissue. As a result, the prior art fails to provide a system for or method of obtaining a direct view of a dynamic heart valve. Consequently, it would be beneficial to have a system for and methods of obtaining a direct view of heart valves. It would further be beneficial if the system and method enabled fluoroscopic views and/or echocardiographic views. It would still further be beneficial if such methods and procedures included reanimation of a cadaveric heart.

Garrett and Fernandez teach systems for and methods of pumping fluid into cadavers, thereby creating a surgical model that is superior to models previously available. Unfortunately, such methods were somewhat limited by the fluid available for use with such systems and methods. In particular, existing fluids fail to properly replicate certain properties of human (or animal) blood, particularly coagulation properties of such blood. For instance, existing fluids fail to simulate natural clotting cascades and/or fail to accurately simulate responses to pharmaceutical elements, hemostatic agents, and the like. Furthermore, use of actual blood is not feasible for existing methods because such methods merely model the human circulatory system; they do not replicate it. In existing circulatory models, blood would tend to form clots in such a way (such as forming clots in a reservoir, in a cannula, in a blood vessel, within cadaveric tissue, or the like) that would be unrepresentative of clot formation within a live patient. Consequently, it would be beneficial to have a fluid for and a method of modeling blood. Furthermore, it would be beneficial to have systems for and methods of making and using simulation blood, including systems for and methods of controlling or otherwise influencing coagulation properties of such simulation blood. Furthermore still, it would be beneficial to have simulation blood that accurately simulates a natural clotting cascade of real blood. Furthermore yet, it would be beneficial to have simulation blood that accurately simulates responses to pharmaceutical elements, hemostatic agents, and the like.

SUMMARY OF THE INVENTION

The present invention includes systems for and methods of modeling a living patient (or at least living tissue) during physician training and medical research. In some embodiments, the model includes a cadaver (or cadaveric tissue) and methods include perfusing the cadaver (or cadaveric tissue). In some embodiments, the model is mobile, thereby facilitating training for a variety of scenarios, such as "emergency room" scenarios, "accident scene" scenarios, "natural disaster" scenarios, "crime scene" scenarios, "terrorism" scenarios, "battlefield" scenarios, and the like. In some embodiments, the present invention includes simulation blood and systems for and methods modeling blood using simulation blood, such as by controlling or otherwise influencing coagulation properties of the simulation blood. In some embodiments, the present invention includes systems for and methods of making and using the simulation blood. In some embodiments, the simulation blood is configured to accurately simulate a natural clotting cascade of real blood and/or methods of using the simulation blood promote the same. In some embodiments, the simulation blood is configured such that it accurately simulates (and/or methods of using simulation blood promote accurate simulations of) responses to pharmaceutical elements, hemostatic agents, and the like.

In some embodiments, a model of the present invention includes portions of a first cadaver, such as cadaveric tissue associated with certain training and/or research. In some such embodiments, the model is configured so as to facilitate replacing the cadaveric tissue of the first cadaver with corresponding cadaveric tissue of a second cadaver, thereby facilitating additional training and/or research without requiring a whole cadaver. In some embodiments, a foreign cardiovascular branch is used with a first and/or second cadaver and/or with cadaveric tissue associated with the first and/or second cadaver. In some embodiments, a cadaveric cardiovascular branch of the first cadaver is used with the second cadaver. In some embodiments, a synthetic cardiovascular branch is used with one or more cadaver and/or with cadaveric tissue from one or more cadaver.

In some embodiments, the present invention includes systems for and methods of reanimating cadaveric hearts. In some embodiments, the present invention includes use of clear fluids so that visualization of interior portions of a reanimated heart is not impeded by fluid flowing through the heart. In some embodiments, the present invention facilitates direct views of heart valves, such as heart valves within reanimated cadaveric hearts. In some embodiments, fluoroscopic views and/or echocardiographic views are enabled.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention and various features thereof.

BRIEF DESCRIPTION OF THE DRAWINGS

A preferred embodiment of the invention, illustrative of the best mode in which the applicant has contemplated applying the principles, is set forth in the following description and is shown in the drawings and is particularly and distinctly pointed out and set forth in the appended claims.

DETAILED DESCRIPTION

Figure 1:
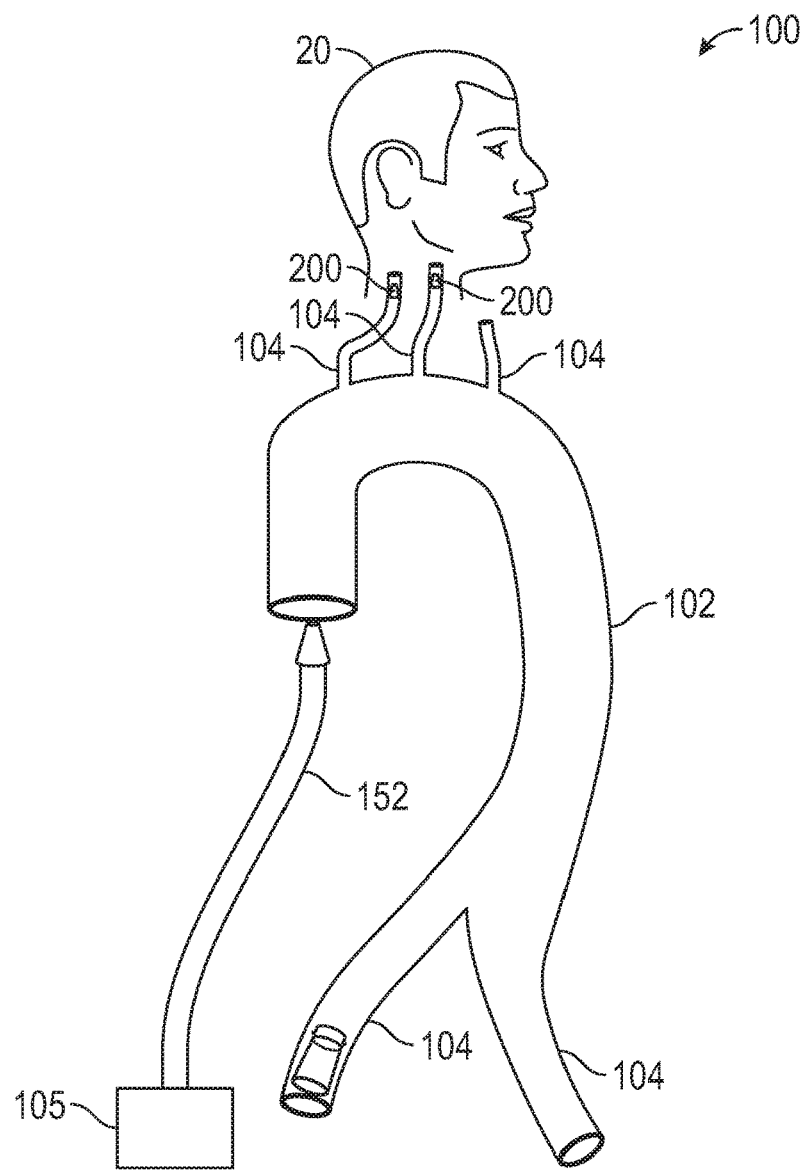
FIG. 1 is a perspective view of an aortic branch of an embodiment of the present invention, the aortic branch shown connected to a cadaver head using a method of the present invention, and thereby facilitating execution of other methods of the present invention.

As required, a detailed embodiment of the present invention is disclosed herein; however, it is to be understood that the disclosed embodiment is merely exemplary of the principles of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Disclosed are systems and methods of reconstituting circulation in a human cadaver. Although only human cadavers are discussed and shown in detail herein, it should be understood that an animal cadaver could alternatively be used. A cadaver reconstituted with circulation according to the present disclosure can have life-like tissue integrity, anatomic accuracy, and a functional circulatory system to simulate bleeding. The disclosed systems and methods can thus provide an ideal model for physician training and development of medical devices.

Some embodiments of the present invention include systems for and methods of preparing cadavers, organs, and/or body parts for perfusion. In some embodiments, the circulatory system of a cadaver and/or vessels of one or more organ and/or body part is flushed using one or more method now known or later developed. In some embodiments, fresh cadavers, organs, and/or body parts are utilized with one or more system and/or for one or more method of the present invention. In some embodiments, one or more cadaver, organ, and/or body part is preserved, such as by embalming, by freezing, and/or by one or more other preservation means now known or later developed. In some embodiments, preparation of the cadaver, organ, and/or body part includes perfusing the same with a first fluid configured to occlude one or more arterioles, capillaries, venules, and/or other small vessels, thereby defining at least a first fluid pathway, such as a fluid pathway associated with an aortic branch, a vena cava branch, a pulmonary artery branch, and/or a pulmonary vein branch of the circulatory system. The first fluid can be a perfusing mixture that includes a liquid medium, an embolization material, and/or a flocculating agent. It is to be understood that the perfusing mixture can be a homogeneous mixture (e.g., a solution), or a heterogeneous mixture (e.g., suspension, colloid). In some embodiments, the first fluid is flushed from, or otherwise removed from, the first fluid pathway so as to facilitate perfusing the first fluid pathway with a second fluid. In some embodiments, the second fluid is blood (e.g., expired blood or animal blood), includes blood, and/or simulates blood.

Some embodiments of the present invention include systems for and methods of replicating or closely approximating live patient conditions. In some embodiments, the systems and methods employ one or more heater or other means of controlling temperature of the second fluid as it flows into the first fluid pathway. In some embodiments, the systems and methods utilize pumps, resistance devices, and/or one or more other means now know or later developed for generating pressure within the first fluid flowpath and/or for mimicking a pulse and/or blood circulation associated with the same.

Systems and methods of some embodiments of the present invention reconstitute circulation through and/or cardiovascular pressure within a whole body cadaver, thereby facilitating realistic training, such training associated with coordination and execution of simultaneous and/or sequential procedures (e.g., to practice multiple medical procedures). In other embodiments, systems and methods of the present invention reconstitute circulation through and/or cardiovascular pressure within a portion of a cadaver, such as a limb, an organ, or the like.

Hybrid Cardiovascular Model

Referring to FIG. 1, some methods of the present invention utilize one or more foreign cardiovascular branch 100 within a cadaver and/or with cadaveric tissue 20. In some embodiments, at least part of the foreign cardiovascular branch 100 is harvested from a first cadaver and the cadaveric tissue 20 is harvested from a second cadaver. In some embodiments, at least part of the foreign cardiovascular branch 100 is harvested from a first species and the cadaveric tissue 20 is harvested from a second species. In some embodiments, the foreign cardiovascular branch 100 is a synthetic cardiovascular branch 100 that is configured to replicate all or a portion of an arterial and/or venous branch of a circulatory system of a first and/or second cadaver of a first and/or second species. In some embodiments, the synthetic cardiovascular branch 100 is formed from plastic, metal, silicone, rubber, or any other material suitable for such use.

Some synthetic cardiovascular branches 100 of the present invention comprise a primary section 102 defining a primary lumen. In some embodiments, the primary section 102 is configured to replicate at least a portion of a primary vessel of a circulatory system, such as an aorta, a vena cava, a pulmonary artery, a pulmonary vein, or the like. In some embodiments, the synthetic cardiovascular branch 100 includes a plurality of terminal branches 104 extending from the primary section 102. In some embodiments, each terminal branch 104 defines a respective terminal lumen such that each terminal branch 104 is configured to replicate at least part of a secondary vessel of the circulatory system.

In some embodiments, each terminal branch 104 is configured to selectively couple to respective cadaveric organs, limbs, and/or other cadaveric tissue such that the cadaveric tissue is in fluid communication with the primary lumen through the respective terminal lumen. In this way, the synthetic cardiovascular branch 100 facilitates perfusion of the cadaveric tissue. In some embodiments, at least one terminal branch 104 defines, includes, and/or is otherwise associated with a cannula, a catheter, or the like (a "cannula" 106 (reference FIG. 3)). In some embodiments, each cannula 106 is configured to accommodate perfusion of respective cadaveric tissue.

In some embodiments, one or more terminal branch 104 includes and/or is associated with a means of selectively preventing or otherwise inhibiting fluid flow through a respective lumen. In this way, perfusion of a first tissue (i.e. a first organ, limb, head, etc) associated with a first terminal branch 104 can be conducted independent of perfusion of a second tissue associated with a second terminal branch. In some embodiments, the means of selectively preventing or otherwise inhibiting fluid flow includes a clamp, a valve, or the like (each a "valve" 105 (reference FIG. 3)). In some embodiments, each valve 105 can be selectively moved between respective off and on configurations so as to facilitate selective perfusion, thereby maximizing efficiency and/or minimizing costs associated with surgical training and/or medical research and development.

Some embodiments of the present invention include an adaptor 200 for forming an impermeable seal between cadaveric tissue and a foreign cardiovascular branch. In some embodiments, the adaptor 200 is configured to work with a variety of foreign cardiovascular branches, such as a variety of synthetic and/or organic materials. In some embodiments, the adaptor 200 is configured to couple tissue of a first cadaver to a synthetic cardiovascular branch. In some embodiments, the adaptor 200 is configured to couple tissue of a first cadaver to a cadaveric cardiovascular branch of a second cadaver. In some such embodiments, the first cadaver is a cadaver of a first species and the second cadaver is a cadaver of a second species.

Figure 2:
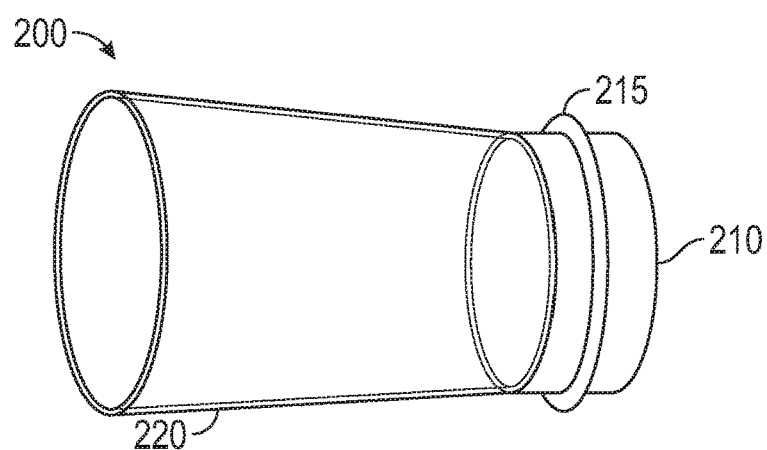
FIG. 2 is a perspective view of an adaptor of the present invention, the adaptor being configured to connect a cardiovascular branch to cadaveric tissue.

Referring to FIG. 2, some adaptors 200 of the present invention include a base 210 that is configured to engage with a distal end of a terminal branch 104 of a foreign cardiovascular branch. In some embodiments, the adaptor 200 includes a continuous wall 220 extending from the base 210, thereby defining a passageway through which fluid can flow between the foreign cardiovascular branch and the cadaveric tissue. In some embodiments, the base 210 includes a rim 215 extending radially from an outer surface of the base. In some embodiments, the rim 215 is configured to facilitate securing the cadaveric tissue to the adaptor 200, such as by way of a suture or otherwise. In some embodiments, the adaptor defines one or more aperture and/or includes one or more other feature that is configured to facilitate securing the tissue to the adaptor 200, such as via sutures or otherwise.

Some adaptors 200 of the present invention include a frustoconical portion. In some embodiments, the frustoconical portion of the adaptor 200 is formed at least partially from a continuous wall 220 of the adaptor 200. In some embodiments, the frustoconical portion is hollowed and has a wall thickness of 2 mm or less. In some embodiments, the adaptor 200 is placed at least within the artery and secured with a suture or other cinching device. In some such embodiments, the suture is kept from slipping from the adaptor because of a grommet or elevated edge. Similarly, the adaptor is placed at least partially into the synthetic artery and secured. In some embodiments, the conical interior shape allows for the passage of devices without obstruction.

Figure 3:
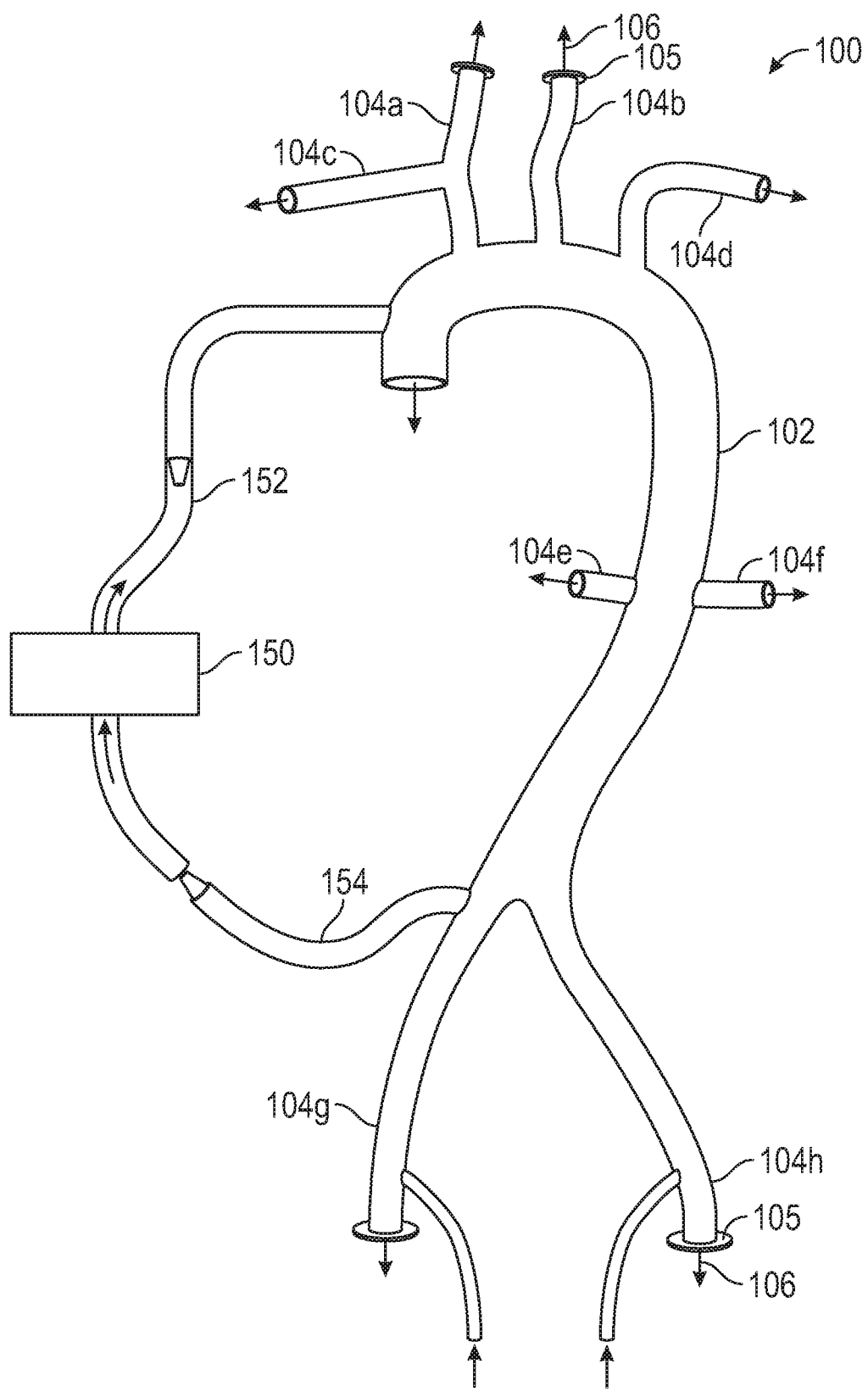
FIG. 3 is a perspective view of a synthetic aortic branch of the present invention.

By way of example, as shown in FIG. 3, some embodiments of the foreign cardiovascular branch 100 replicate an aortic branch of a first cadaver. Some such embodiments include a plurality of terminal branches, such as a vertebral artery branch 104a, a carotid artery branch 104b, right 104c and left 104d subclavian branches, first 104e and second 104f renal branches, right 104g and left 104h femoral branches, or the like. In some embodiments, each terminal branch includes a cannula 106 extending from a valve 105, thereby facilitating control of fluid flow to respective cadaveric tissue.

In some embodiments, the present invention includes and/or is otherwise configured to interface with a pump 150 so as to direct fluid through a primary portion 102 of the foreign cardiovascular branch 100, thereby facilitating flow to a cadaver and/or tissue 20 of a cadaver via one or more terminal branch 104. In some such embodiments, fluid is directed from the pump 150 into the primary portion 102 of the foreign cardiovascular branch 100 through a first line 152, such as a tube or other line extending therebetween. In some embodiments, fluid is drawn into the pump through a second line 154, such as a tube or other line extending from the foreign cardiovascular branch 100 to the pump 150. In other embodiments, the pump is at least partially submerged in fluid.

Some embodiments of the present invention include a method of perfusing cadaveric tissue 20. In some embodiments, perfusion of cadaveric tissue 20 is accomplished with a single cannula 106 for introducing fluid into the cadaveric tissue 20. In some such embodiments, fluid is allowed to flow out of the cadaveric tissue 20, such as through a severed portion of the cadaveric tissue 20, and into a collection device for later use. In some embodiments, the collection device is associated with the cadaveric tissue 20 so as to minimize loss of fluid and/or to maximize the ability of the perfused cadaveric tissue to simulate live tissue and environments associated with performing a surgery or other medical procedure on such tissue. In some embodiments, a second line 154 of the present invention extends into the collection device, thereby facilitating pumping fluid from the collection device back to the cadaveric tissue 20. In some embodiments, the pump 150 is at least partially submerged in fluid within the collection device.

By way of example, as shown in FIG. 1, terminal branches 104 of a foreign cardiovascular branch 100 of some embodiments of the present invention are configured to facilitate perfusing a cadaveric head 20, such as by attaching vertebral and carotid artery branches of a foreign cardiovascular branch 100 to respective vertebral and carotid arteries of the cadaveric head 20. In this way, vessels and/or organs of the cadaveric head 20 can be studied, surgical training can be accomplished, and/or medical research and development can be advanced. In some embodiments, similar attachments and perfusions are provided for one or more other organ, limb, and/or other tissue.

Portable Pressurized Cadaveric Perfusion

Figure 4:
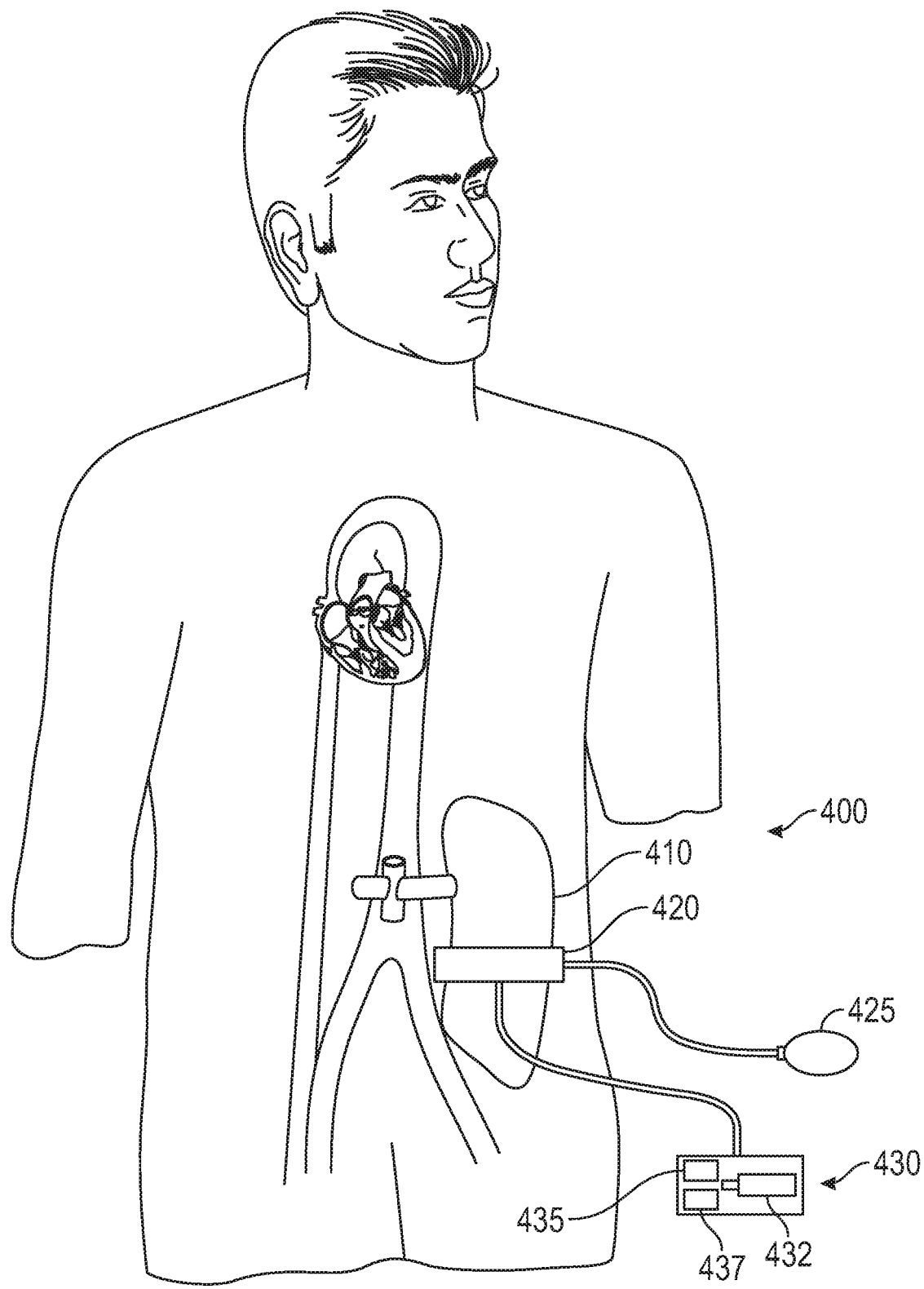
FIG. 4 is a schematic view of a mobile perfusion system of an embodiment of the present invention.

Referring to FIG. 4, some embodiments of the present invention comprise a mobile system 400 for reconstituting a cadaver and a method of doing the same. In some embodiments, the mobile system is configured to provide continued pressurization of the circulator system of a cadaver and/or a portion of a cadaver. In some embodiments, a container 410 (such as a bag, a bottle, or the like) of the mobile system defines an interior volume for holding a volume of fluid, such as simulation blood. In some embodiments, the interior volume of the container 410 is configured to be in fluid communication with an arterial and/or venous system of the cadaver, such as via a cannula and tubing system. In this way, controlling pressure within the interior volume of the container 410 controls fluid flow through the cadaver and/or perfusion pressure associated with the cadaver.

In some embodiments, the container 410 is configured to be implanted at least partially within a cavity of a cadaver and/or is configured to be otherwise associated with a cadaver (such as in backpack or other container carried alongside or attached externally to the cadaver) so as to facilitate mobile cadaver perfusion. In this way, surgical training and/or medical research and development can be accomplished in a manner that more closely approximates real-life situations. In some embodiments, the container 410 is configured to be placed inside a thoracic or abdominal cavity of the cadaver. In some embodiments, containers 410 of various sizes, such as from 500 ml to 5000 ml, are utilized depending on the location of the container 410, the size of the cadaver, and/or a specific simulation need.

In some embodiments, perfusion is accomplished using a mobile pump, such as a pulsatile or non-pulsatile pump, and/or one or more other means of generating pulsatile and/or non-pulsatile pressures. In some embodiments, the system includes one or more gage or other means of determining pressure within the container 410 and/or pressure otherwise associated with perfusion of the cadaver.

In some embodiments, a compression assembly 420 is engaged with the container 410 and is configured to control pressure within the interior volume of the container 410. In some embodiments, the compression assembly 420 includes a compression chamber, such as a compression chamber of a compression sleeve, or the like. In some embodiments, the compression assembly 420 is configured such that pneumatically inflating the compression chamber causes pressure in the container 410 to increase, thereby facilitating perfusion and/or increasing perfusion pressure. In some embodiments, the compression assembly 420 includes a primary inflation device 425, such as a hand pump, for creating a rhythmic increase and decrease of pressure, thereby replicating a pulse.

In some embodiments, the compression assembly 420 includes a secondary inflation device 430 to facilitate maintaining a desired baseline pressure within the container 410. In some embodiments, the secondary inflation device includes a means of inflating or otherwise increasing pressure within the compression chamber ("inflating" the compression chamber), such as via a compressed gas cartridge or the like (a "gas cartridge" 432). In some embodiments, the secondary inflation device includes a trigger assembly 435 for initiating inflation of the compression chamber, thereby increasing pressure within the container 410. In some embodiments, inflation of the compression chamber is initiated if pressure within the container 410 falls below a threshold value.

In some embodiments, the trigger assembly 435 includes a spring member ("trigger spring") that is configured to move the trigger assembly 435 between an activated and a deactivated configuration, thereby causing the secondary inflation device 430 to be connected and disconnected from the compression chamber, respectively. In some embodiments, the gas cartridge 432 is in fluidic communication with the compression chamber when the secondary inflation device 430 is connected with the compression chamber. In some embodiments, fluidic communication between the compression chamber and the gas cartridge 432 is inhibited when the second inflation device 430 is disconnected from the compression chamber.

In some embodiments, the trigger spring biases the trigger assembly towards an activated configuration. In some embodiments, the compression assembly 420 includes a secondary device 437, such as an inhibiting spring, for biasing the trigger assembly 430 towards a deactivated configuration. In some embodiments, the secondary device 437 is configured such that a biasing load of the secondary device 437 overcomes a biasing load of a trigger spring if pressure within the container 410 is equal to or greater than a threshold value, such as a minimum, maximum, and/or optimum pressure value. In some embodiments, the trigger spring is configured such that a biasing load of the trigger spring overcomes a biasing load of the secondary device 437 if pressure within the container 410 is equal to or less than a threshold value, such as a minimum, maximum, and/or optimum pressure value. In this way, the trigger spring and the secondary device 437 are configured to work together to maintain pressure in the container 410 within a pressure range, such as a pressure range associated with the minimum, maximum, and/or optimum pressures associated with the same.

In some embodiments, loss of pressure within the container 410 is associated with perfusion of the cadaver and/or fluid loss associated with the same. In this way, the compression assembly is configured to mitigate pressure losses associated with such perfusion and/or fluid loss, thereby increasing stability and controllability of such perfusion.

In some embodiments, the present invention includes a means of determining perfusion pressure at a perfusion site (and/or within a cadaver), thereby facilitating monitoring of the same. In this way, a user can reduce risks associated with over-pressurizing cadaver vessels, thereby reducing risk of damage to the cadaver, cadaver tissue, or the like. In some embodiments, the means of determining perfusion pressure at a perfusion site (and/or within a cadaver) includes use of a side port extending from a perfusion cannula. In some embodiments, tubing extends from the side port to a pressure gage. In some embodiments, the pump stops pumping fluid or otherwise reduces fluid pressure, as applicable, if the perfusion pressure exceeds one or more threshold value.

Functional Heart Valve Model:

Some embodiments of the present invention comprise a system for and methods of obtaining a direct view of heart valves. In some embodiments, the systems and methods enable fluoroscopic views and/or echocardiographic views of heart functions, such as opening and closing of valves and/or flow of fluid between heart chambers. The method includes reanimation of a cadaveric heart. In some embodiments, the heart is isolated and harvested from a cadaver. In other embodiments, the heart is left in-situ in the chest of a partial or whole cadaver. In some such embodiments, the heart remains in fluid communication with the arterial and venous system of the cadaver. In some embodiments, the heart is connected to a foreign cardiovascular branch, such as a foreign arterial and/or venous branch.

In some embodiments, preparation of a cadaver is required. In some embodiments, the heart is prepared prior to finalizing preparation of the cadaver. In some embodiments, clots are flushed from the cadaver and/or clots from the heart are extracted through small incisions made in the aorta, right atrium, and/or left atrial appendage. In some embodiments, the successful removal of all postmortem debris and thrombus is confirmed using a video endoscope. In some such embodiments, the heart is then prepared for perfusion either in-situ in the cadaver chest or once extracted.

Some embodiments of the present invention cause movement of the heart valves to mimic a beating heart, thereby facilitating medical training and testing of medical devices. In some embodiments, fluid is pumped in and out of one or more chamber of the heart so as to cause valves to open and close. In some such embodiments, pulsatile pressurization of the various chambers of the heart causes valves of the heart to open and close. In some embodiments, pumping fluid into a chamber (or otherwise injecting a substance into the chamber) causes a chamber to distend and/or causes an adjacent chamber to collapse, at least partially. In some embodiments, a pressure gradient from one side of the valve to the other is controlled using a pulsatile pump. In some embodiments, the pulsatile pump mimics the conditions within the heart. This also allows gradients created by valve stenosis to be calculated, such as if volumes of flow between chambers are known and/or if extrinsic pressure gradients created by the pump are known. In some embodiments, pressure gradients and volumes are utilized in determining an amount of reflux fluid associated with valve regurgitation. In some embodiments, echocardiography is used to demonstrate valve stenosis and/or regurgitation.

In some embodiments, pumping fluid in and out of the right ventricle causes the tricuspid valve to close and open, respectively, and/or causes the pulmonary valve to open and close, respectively. In some embodiments, fluid in the right ventricle is prevented from (or is otherwise inhibited from) flowing backwards through the tricuspid valve. In some embodiments, fluid is at least slightly inhibited from flowing past the pulmonary valve, such inhibiting force being configured to approximate natural inhibiting forces associated with the pulmonary branch of the circulatory system.

In some embodiments, pumping fluid in and out of the left ventricle causes the mitral valve to close and open, respectively, and/or causes the aortic valve to open and close, respectively. In some embodiments, fluid in the right ventricle is prevented from (or is otherwise inhibited from) flowing backwards through the mitral valve. In some embodiments, fluid is at least slightly inhibited from flowing past the aortic valve, such inhibiting force being configured to approximate natural inhibiting forces associated with the aortic branch of the circulatory system.

Figure 5:
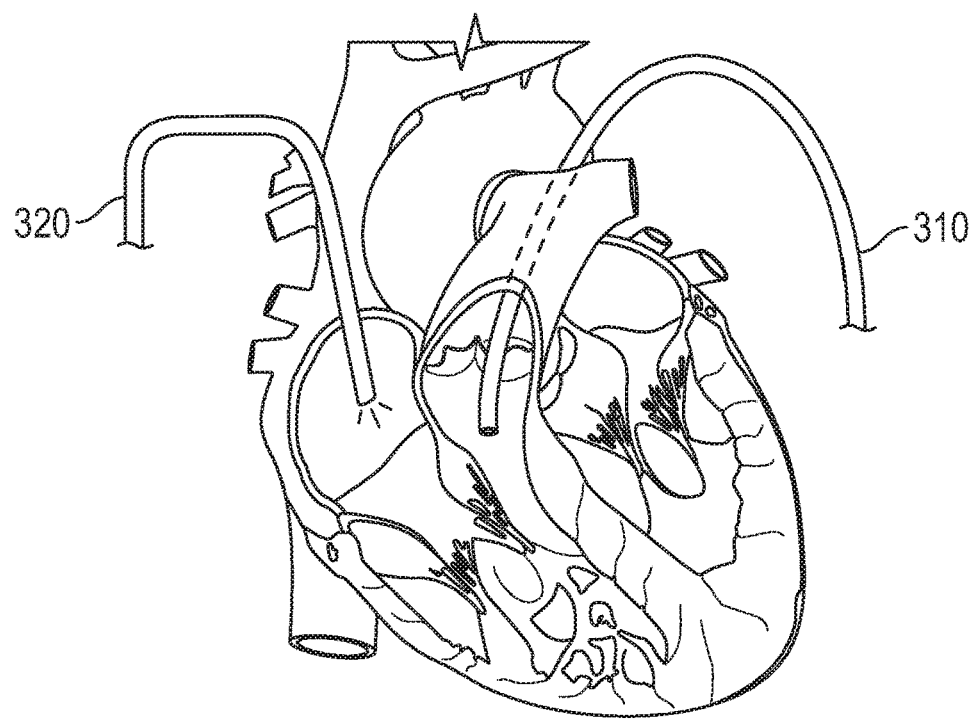
FIG. 5 is a partial cutaway view of a cadaver heart showing cannulation and scope placement associated with a method of the present invention for visualizing a tricuspid valve.

Referring to FIG. 5, some embodiments of the present invention include a method of obtaining visualization directly using an endoscopic of a tricuspid valve. In some embodiments, the pulmonary veins are ligated. In some embodiments, a perfusion cannula 310 is placed through a pulmonary artery across the pulmonary valve into the right ventricle. In other embodiments, the apex of the ventricle is directly cannulated. An endoscope 320 is placed into the right atrium and directed towards the tricuspid valve, thereby facilitating visualization of the tricuspid valve.

Figure 6:
FIG. 6 is a partial cutaway view of a cadaver heart showing cannulation and scope placement associated with a method of the present invention for visualizing a pulmonary valve.

Referring to FIG. 6, some embodiments of the present invention include a method of obtaining visualization directly using an endoscopic of a pulmonary valve. In some such embodiments, the pulmonary veins are ligated. In some embodiments, a perfusion cannula 310 is placed through the superior vena cava through the tricuspid valve into the right ventricle. In other embodiments, the inferior vena cava is cannulated. An endoscope 320 is placed into the pulmonary artery and directed towards the pulmonary valve, thereby facilitating visualization of the pulmonary valve.

Figure 7:
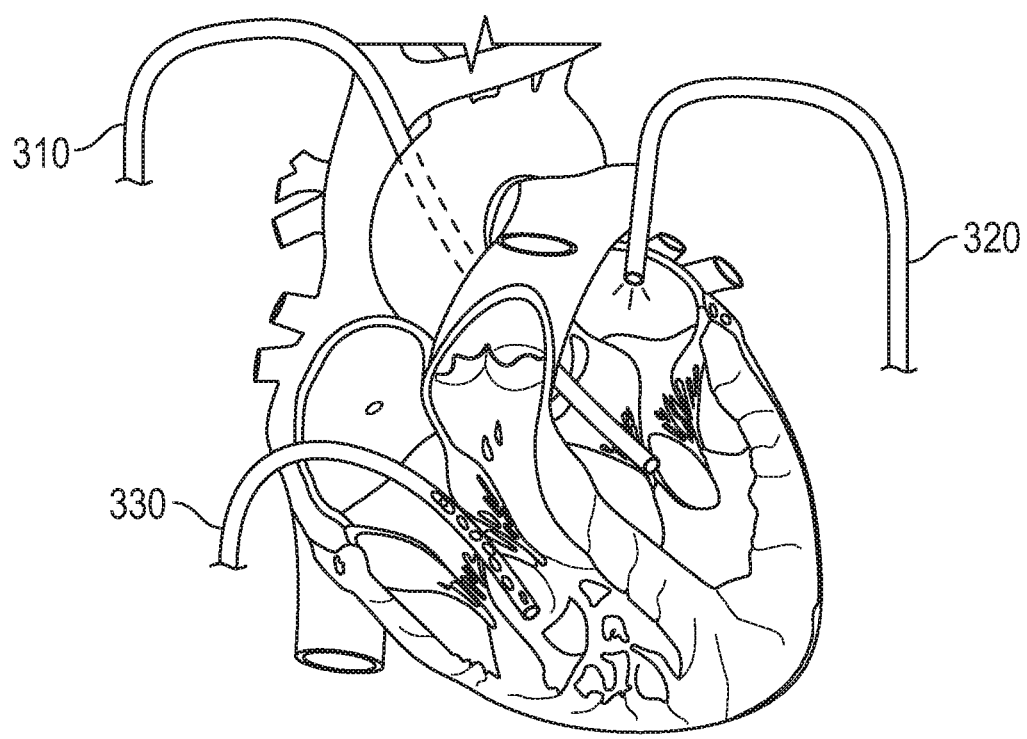
FIG. 7 is a partial cutaway view of a cadaver heart showing cannulation and scope placement associated with a method of the present invention for visualizing a mitral valve.

Referring to FIG. 7, some embodiments of the present invention include a method of obtaining visualization directly using an endoscopic of a mitral valve. In some such embodiments, the pulmonary veins are ligated. In some embodiments, the pulmonary arteries are ligated. In some embodiments, a perfusion cannula 310 is placed into the aorta through the aortic valve and into the left ventricle. In other embodiments, direct left ventricular apical cannulation may be performed. An endoscope 320 is introduced into the left atrial appendage or into a pulmonary vein. In this way, a view of the mitral valve from the left atrium is obtained. In some embodiments, a drainage cannula 330 is placed through the right atrium across the tricuspid valve and into the right ventricle so as to facilitate draining any fluid return from the coronary sinus.

Figure 8:
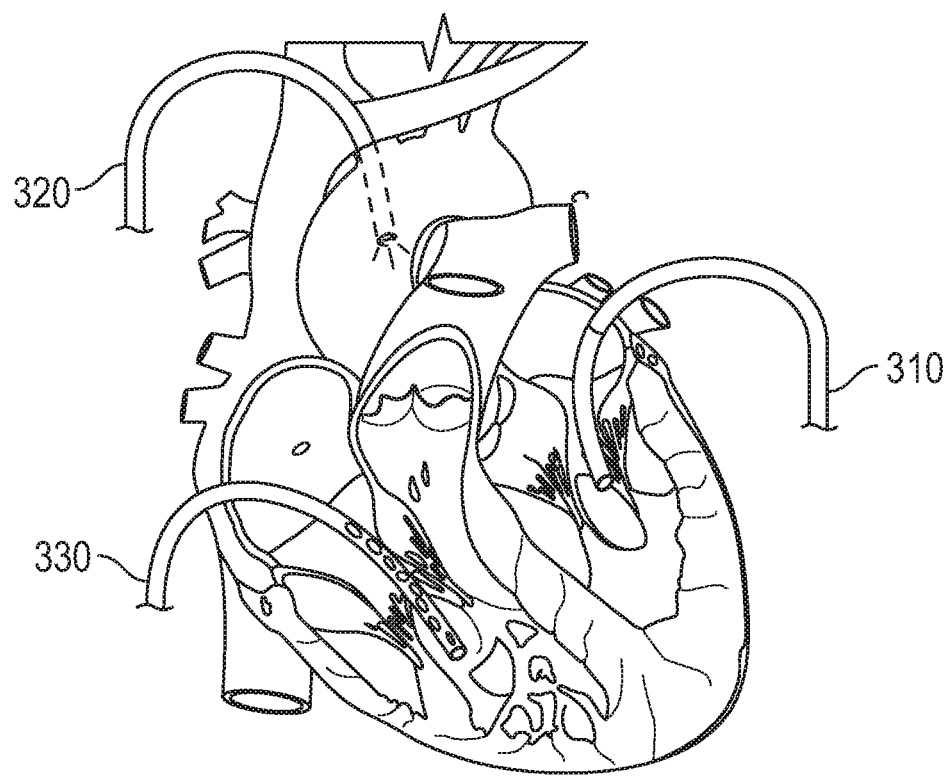
FIG. 8 is a partial cutaway view of a cadaver heart showing cannulation and scope placement associated with a method of the present invention for visualizing an aortic valve.
Figure 9:
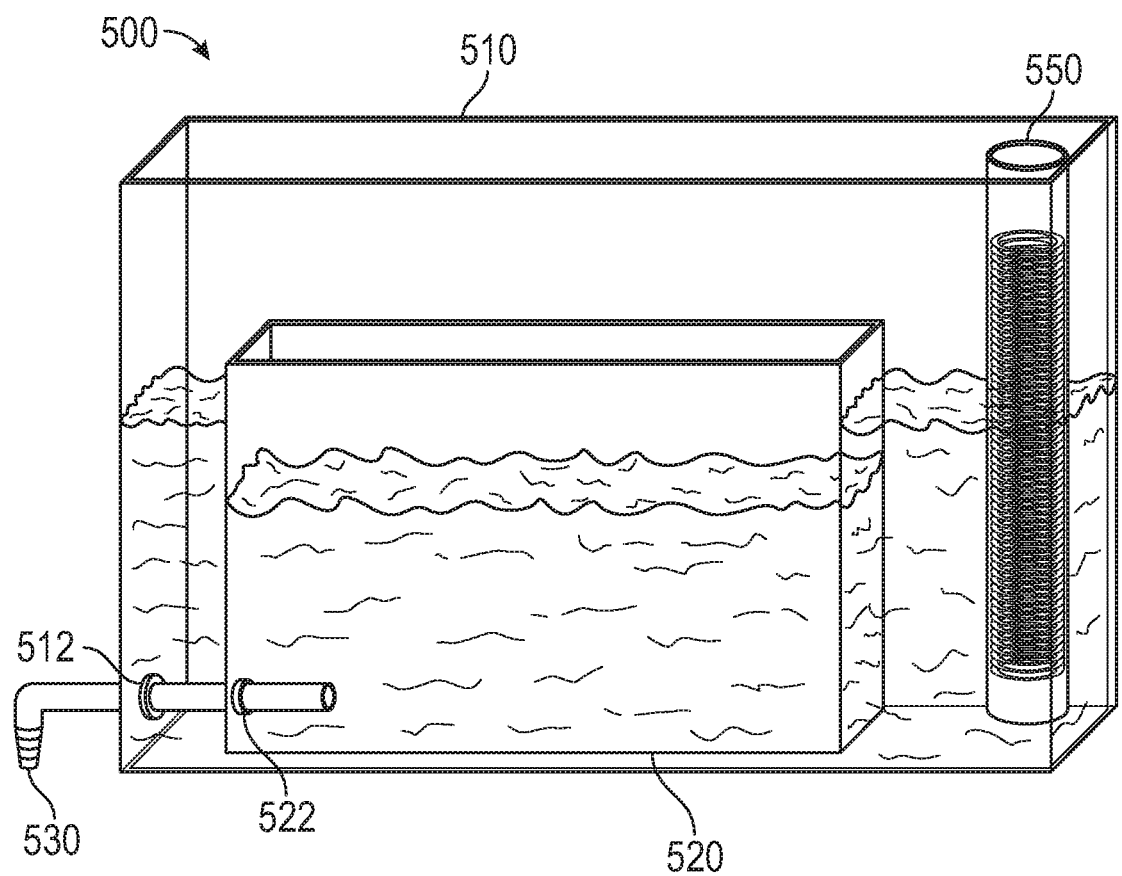
FIG. 9 shows a water bath of certain embodiments of the present invention.

Referring to FIG. 8, some embodiments of the present invention include a method of obtaining visualization directly using an endoscopic of an aortic valve. In some such embodiments, the pulmonary veins are ligated along with the pulmonary artery. In some embodiments, a perfusion cannula 310 is placed into the left atrial appendage through the mitral valve and into the left ventricle. In other embodiments, direct left ventricular apical cannulation is performed. An endoscope 320 is introduced into the right carotid (or alternatively into the aorta directly). In this way, a direct view of the aortic valve from the aortic side is obtained. In some embodiments, a drainage cannula 330 is placed through the right atrium across the tricuspid valve and into the right ventricle so as to facilitate draining any fluid return from the coronary sinus.

Some embodiments of the present invention allows for a functional study of the valves while at the same time allowing access to instrumentation via the aorta or vena cava. After preparing the heart (and the cadaver, if applicable), a fluid is utilized to animate the visualized valve. In some embodiments, the fluid is clear so as to not adversely interfere with visualization of the valve. In some embodiments, the fluid includes and/or consists of viscosifiers and/or dispersants.

In some embodiments, the fluid is forced into the heart, such as by a pump or otherwise. In some embodiments, the pump consists of a piston and cylinder without valves, thereby facilitating to and fro displacement of the fluid in and out of the heart chamber. In some embodiments, to and fro pulsation allows for analysis of leaks through the valve. In some embodiments, the piston includes a nozzle for connecting to a reservoir, thereby facilitating replacement of fluid losses.

Simulation Blood and Method of Simulating Blood

Some embodiments of the present invention include a simulation blood that is configured to resist untimely clotting (such as during storage or transportation of the fluid) while promoting timely coagulation (such as in association with a surgical procedure), thereby more accurately modeling blood so as to facilitate more accurately modeling a live patient. In some embodiments, the simulation blood is transformable from a first formulation that resists clotting (such as a solution having an anticoagulant agent (an "anticoagulant") and/or a solution in which clotting factors have been bound up, such as with a dispersant or otherwise) to a second formulation that promotes coagulation (such as a solution having an anticoagulant antidote (a "reversal agent") for counteracting the anticoagulant and/or a solution in which a sufficient number of clotting factors are unbound).

In some embodiments, the simulation blood is configured to occlude arterioles, capillaries, venules, and/or other small vessels, such as in an occlusion process of the present invention. In other embodiments, the simulation blood is configured for use within cardiovascular branches after arterioles, capillaries, venules, and/or other small vessels have been occluded by an occlusion fluid (such as a first fluid) or otherwise.

Some embodiments of the present invention include creating simulation blood that resists or retards coagulation. In some such embodiments, an anticoagulant (such as Ethylenediaminetetraacetic acid ("EDTA"), calcium citrate, heparin, Xa inhibitors, direct thrombin inhibitors, or any other appropriate anticoagulant now known or later developed) is mixed with real blood so as to create the simulation blood. In some embodiments, the simulation blood includes enough anticoagulant to bind up all (or substantially all) calcium within the real blood, thereby preventing such calcium from being used by clotting factors (i.e. proteins) of the blood for formation of clots. In this way, the simulation blood can be held within a container, such as a mobile container of the present invention.

Some embodiments of the present invention include transforming a first formulation of simulation blood (such as a formulation containing an anticoagulant) into a second formulation of simulation blood, the second formulation of simulation blood being configured to replicate natural coagulation of human blood (or in the case of veterinary medicine, blood of a respective animal). In some embodiments, a second formulation of simulation blood includes a reversal agent (such as protamine, calcium chloride, calcium gluconate, or any other appropriate reversal agent now known or later discovered) for counteracting an anticoagulant of the first formulation and/or for otherwise providing a sufficient amount of unbound calcium for use by clotting factors in forming clots. In this way, the effectiveness of the anticoagulant of the second formulation is reduced or otherwise diminished from that of the first formulation. In some embodiments, the second formulation of the simulation blood includes excess unbound calcium such that the second formulation can be diluted by the first formulation to form a third formulation having unbound calcium. In some embodiments, the amount of unbound calcium in the third formulation of the simulation blood is sufficient to enable clot formation.

In some embodiments, a reversal agent is injected into or otherwise added to the simulation blood so as to counteract or remove an anticoagulant. In some embodiments, introducing a reversal agent to the simulation blood facilitates natural clotting cascades. In some embodiments, the reversal agent is placed within a cavity of a cadaver. In some such embodiments, the reversal agent is introduced to the simulation blood upon the simulation blood entering the cavity (such as at a cut, wound, laceration, or the like (a "laceration")). In some embodiments, the reversal agent is applied to a local area, such as a local surgical site, such that introduction of the reversal agent to the simulation blood is accomplished upon the simulation blood moving to the local area. In some embodiments, the reversal agent is contained in and/or otherwise associated with an object (such as gauze, a surgical pad, or the like) such that application of the object to a laceration causes the reversal agent to interact with the simulation blood. In some embodiments, cadaveric tissue of the cadaver is saturated with a fluid comprising the reversal agent such that introduction of the reversal agent to the simulation blood is associated with the simulation blood moving into the saturated tissue.

In some embodiments, arterial and/or venous systems of a cadaver are flushed of thrombi and other debris and/or such thrombi and/or debris are otherwise removed from a cadaver and/or cadaveric tissue using methods now known or later developed. In some embodiments, a first fluid is utilized to occlude capillaries and/or other vessels of a cardiovascular system of the cadaver and/or the cadaver and/or cadaveric tissue is embalmed and/or perfused with the first fluid. In some embodiments, the first fluid includes a reversal agent. In some embodiments the reversal agent is absorbed into at least some of the cadaveric tissue. In some such embodiments, at least some of the reversal agent remains in the tissue after the first fluid is flushed from the cadaveric cardiovascular system. In some embodiments, some of the first fluid remains in the cadaveric cardiovascular system, thereby mixing with the simulation blood upon perfusing the cadaver with the simulation blood, such as in preparation for a training procedure.

In some embodiments, the first fluid includes a dispersant, such as a surfactant (i.e. Acumer or the like). In some embodiments, the dispersant retards clot formation within the cadaver, such as by binding up clotting factors of the simulation blood, thereby preventing such clotting factors from forming clots. In some embodiments, the dispersant binds up all (or substantially all) clotting factors of the simulation blood when a concentration of the first fluid to the second fluid is relatively high (such as 1 to 1) but not when it is relatively low (such as 1 to 10). In this way, the clotting factors of the simulation blood can be bound up initially upon introducing simulation blood to a cadaver, but can be unbound upon excess fluid flowing out of the cadaver, such as through a laceration.

In some embodiments, a first formulation of simulation blood is held in a reservoir for use in perfusing a cadaver. In some embodiments, the first formulation includes sufficient anticoagulants to bind all (or substantially all) calcium within the simulation blood. In some embodiments, the simulation blood is transformed from the first formulation to a second formulation by binding clotting factors of the simulation blood, such as by adding a dispersant to the simulation blood. In some embodiments, transforming the first formulation to the second formulation includes adding sufficient calcium to the simulation blood so as to overwhelm the anticoagulant while also replacing calcium bound by the anticoagulant. In some such embodiments, the second formulation includes excess calcium such that a dilution of the second formulation, such as a third formulation formed by diluting the second formulation with the first formulation, includes sufficient unbound calcium to enable clot formation. In some embodiments, the third formulation includes sufficient unbound clotting factors so as to facilitate clot formation.

In some embodiments, coagulation of simulation blood is controlled (or at least influenced) by manipulating one or more factor associated with the blood. In some embodiments, the temperature of the blood affects coagulation properties of the blood. In some embodiments, the temperature-sensitive coagulation properties associated with the simulation blood is attributable to an anticoagulant, such as EDTA or the like. In some embodiments, simulation blood, such as simulation blood containing EDTA, shows various clotting times based on its temperature when the reversal agent is added. In a specific example, 100 mL of EDTA simulation blood (after reversal, such as by mixing the EDTA blood with a reversal agent) at 36 degrees Celsius has demonstrated clotting in 2-3 minutes while the same simulation blood at 17 degrees Celsius has demonstrated clotting in 10-12 minutes. In some embodiments, this variance in clotting time is manipulated so as to provide an element of control within the system. In some embodiments, simulation blood is maintained above 30 degrees Celsius, thereby more closely modeling life-like scenarios. In some embodiments, simulation blood above 30 degrees Celsius yields a clotting time of roughly 3 minutes, similar to that of a live human.

In some embodiments, concentration levels of a first flood relative to simulation blood can be used to manipulate coagulation properties of the simulation blood. In some embodiments, maintaining the concentration at approximately one to one yields little or no clotting. In some embodiments, reducing the concentration to approximately one to ten, clotting is achieved. In some embodiments, after perfusing the cadaver with the first formula, the tubing and reservoirs are changed to simulation blood. In some such embodiments, subsequent perfusion with the simulation blood causes the simulation blood to mix with a residual amount of the first fluid within the vessels of the cadaver, thereby creating an initial concentration that inhibits clotting. In some embodiments, stasis of the simulation blood maintains the concentration relatively constant during pulsatile pressurizations of the system. In some embodiments, the concentration of the fluids change when a bleed occurs and/or when the relative stasis of the simulation blood is otherwise replaced with blood flow, such as blood flow associated with the simulation blood being driven to the site of an injury, such as a laceration or the like. As the mixed fluid flows out of the system, it is replaced with higher and higher concentrations of simulation blood (or, in the alternative, lower and lower concentrations of the first fluid). In this way, the fluid moves from a concentration that inhibits clotting to a concentration that favors clotting. In some embodiments, perfusion of the cadaver is accomplished with a single point of access such that the motion of blood is all in one direction, towards the injury. As such, when a vessel is injured, the injured vessel (and the vessels leading to the injured vessels, as applicable) is (are) the only vessel(s) through which the simulation blood will flow. Accordingly, the mixed fluid will remain in the other vessels, thereby allowing such mixed fluid to remain in its liquid state elsewhere in the cadaver while favoring clotting at the site of injury.

In some embodiments, coagulation properties can be controlled by controlling an amount of anticoagulant and/or reversal agent added to the simulation blood. In a specific example, simulation blood having EDTA has been be reversed to show clotting by various amounts of calcium chloride. In some embodiments, there is a window in which the volume of calcium chloride added greatly affects the clotting time. For instance, in one experiment, EDTA was mixed with real blood at a ratio of 2 ul of EDTA per 1 ml of real blood, thereby forming "EDTA blood". In the experiment, 100 mL of the EDTA blood showed clotting in 6-8 minutes after being mixed with 0.25 mL of calcium chloride. In another experiment, 100 mL of the EDTA blood showed clotting in 1.5-2.5 minutes after being mixed with 2 mL of calcium chloride. In still other experiments, 100 mL of the EDTA blood mixed with excess of 2 mL of calcium chloride did not substantially change the clotting time.

Water Bath

In some embodiments, the present invention includes and/or utilizes a water bath 400 having a first container 510 for holding a first volume of fluid, such as water or the like, and a second container 520 for holding a second volume of fluid, such as simulation blood. In some embodiments, the first fluid is in fluid communication with a heater 550 for heating the first fluid and/or temperature of the first fluid is otherwise controlled using one or more means now known or later developed. In some embodiments, the second container 520 is configured so as to promote or otherwise facilitate heat transfer from the first fluid to the second fluid such that controlling the temperature of the first fluid controls the temperature of the second fluid.

In some embodiments, the first container 510 defines a continuous wall extending between a bottom panel and an open top. In some embodiments, a spigot assembly 530 extends through a first aperture defined by the continuous wall of the first container 510 and into an interior area of the second container 520 through a second aperture defined by the second container 520. In this way, flow of the second fluid away from the second container 520, such as during gravity-feed perfusion of a cadaver, can be accomplished without requiring a tube to extend through the top opening of the first container 510. In some embodiments, the first aperture is located below a fluid line of the first fluid. In some such embodiments, a first seal 512 engages with the first container 510 so as to prevent or otherwise inhibit the first fluid from leaking out of the first aperture. In some embodiments, a second seal 522 engages with the second container 520 so as to prevent or otherwise inhibit the second fluid from leaking out of the second aperture. In some embodiments, the spigot assembly 530 includes at least one threaded portion that extends through the first and/or second apertures. In some such embodiments, the at least one threaded portion of the spigot assembly 530 is configured to engage with the first 512 and/or second 522 seal.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Although the foregoing detailed description of the present invention has been described by reference to an exemplary embodiment, and the best mode contemplated for carrying out the present invention has been shown and described, it will be understood that certain changes, modification or variations may be made in embodying the above invention, and in the construction thereof, other than those specifically set forth herein, may be achieved by those skilled in the art without departing from the spirit and scope of the invention, and that such changes, modification or variations are to be considered as being within the overall scope of the present invention. Therefore, it is contemplated to cover the present invention and any and all changes, modifications, variations, or equivalents that fall with in the true spirit and scope of the underlying principles disclosed and claimed herein. Consequently, the scope of the present invention is intended to be limited only by the attached claims, all matter contained in the above description and shown in the accompanying drawings shall be interpreted as illustrative and not in a limiting sense.

Having now described the features, discoveries and principles of the invention, the manner in which the invention is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

What is claimed is:

1. A method of perfusing a cadaver, the method comprising:
    perfusing the cadaver with a first formulation of a simulation blood, the first formulation comprising natural blood and an anticoagulant for binding calcium of the natural blood, thereby inhibiting clot formation; and
    introducing a reversal agent to the simulation blood so as to overwhelm the anticoagulant and to replace at least part of the unbound calcium of the natural blood.

2. The method of claim 1, further comprising placing the reversal agent within a cavity of the cadaver such that the introducing step is accomplished upon the simulation blood entering the cavity of the cadaver.

3. The method of claim 1, further comprising applying the reversal agent to a local area such that the introducing step is accomplished upon the simulation blood moving to the local area.

4. The method of claim 1, further comprising saturating cadaveric tissue of the cadaver such that the introducing step is accomplished upon the simulation blood moving into the saturated tissue.

5. The method of claim 1, further comprising mixing a dispersant with the simulation blood so as to bind clotting factors of the natural blood.

6. The method of claim 5, wherein the mixing step is completed prior to or contemporaneously with the introducing step such that the introducing step does not enable clot formation.

7. The method of claim 5, wherein the mixing step creates a second formulation of the simulation blood, the method further comprising diluting the second formulation with the first formulation until clotting is enabled.

8. The method of claim 7, wherein the introducing step introduces sufficient calcium such that sufficient calcium is available for a third formulation of the simulation fluid, the third formulation of the simulation fluid being formed by further diluting the second formulation with the first formulation.

9. The method of claim 1, further comprising perfusing the cadaver with a first fluid, thereby occluding capillaries of the cadaver, prior to perfusing the cadaver with the simulation blood, wherein the first fluid comprises the reversal agent, wherein at least some of the first fluid remains in the cadaver, and wherein the introducing step is accomplished after perfusing the cadaver with the simulation blood.

10. The method of claim 9, wherein the first fluid comprises a dispersant that binds up clotting factors of the simulation blood when a concentration of the first fluid to the simulation blood is at a first ratio associated with initially perfusing the cadaver with the simulation blood.

11. The method of claim 10, wherein the first ratio is one to one.

12. The method of claim 11, wherein the reversal agent of the first fluid cancels out the anticoagulant of the simulation blood when a concentration of the first fluid to the simulation blood is at the first ratio and at a second ratio, the second ratio being lower than the first ratio.

13. The method of claim 12, wherein the second ratio is one to ten.

14. The method of claim 12, further comprising pulsating the simulation blood within the cadaver without circulating the blood, wherein the introducing step is accomplished upon the occurrence of an increase of fluid flow into the cadaver after the cadaver has been perfused, the increase in fluid flow being indicative of a laceration of at least one of a cadaveric tissue and a blood vessel.

15. The method of claim 14, wherein the introducing step is accomplished via injecting the reversal agent into the flowing simulation blood.

16. The method of claim 15, wherein the reversal agent is injected into the simulation blood prior to the simulation blood entering a cardiovascular system of the cadaver.

17. A perfusion system for perfusing a cadaver, the system comprising:
a first container for holding a first volume of fluid;
a second container for holding a second volume of fluid, the first container being configured to hold the second container within the first volume of fluid; and
a spigot extending through a first aperture defined by a wall of the first container, the spigot being in fluid communication with the second volume of fluid so as to facilitate perfusion with the second volume of fluid,
wherein the first aperture is positioned below a fluid line of the first container,
wherein the first volume of fluid comprises a first formulation comprising natural blood and an anticoagulant for binding calcium of the natural blood, thereby inhibiting clot formation; and introducing a reversal agent to the simulation blood so as to overwhelm the anticoagulant and to replace at least part of the unbound calcium of the natural blood, and
wherein the second volume of fluid comprises a dispersant.

18. The perfusion system of claim 17, further comprising a heater in fluid communication with the first volume of fluid.

19. The perfusion system of claim 17, wherein the second container is configured to facilitate heat transfer between the first fluid and the second fluid such that controlling a temperature of the first fluid facilitates controlling the temperature of the second fluid.

20. The perfusion system of claim 17, wherein the first container defines an open top, and wherein the spigot provides a means of performing gravity-feed perfusion without requiring a tube to extend through the open top of the first container.

* * * * *